US011970369B2

(12) United States Patent
Roberts et al.

(10) Patent No.: US 11,970,369 B2
(45) Date of Patent: Apr. 30, 2024

(54) BEAM CLIMBER BATTERY CHARGING IN TRANSFER STATION

(71) Applicant: Otis Elevator Company, Farmington, CT (US)

(72) Inventors: Randy Roberts, Hebron, CT (US); Richard L. Hollowell, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 944 days.

(21) Appl. No.: 16/944,804

(22) Filed: Jul. 31, 2020

(65) Prior Publication Data

US 2022/0033221 A1 Feb. 3, 2022

(51) Int. Cl.
*B66B 7/06* (2006.01)
*B66B 9/02* (2006.01)

(52) U.S. Cl.
CPC ................ *B66B 7/064* (2013.01); *B66B 9/02* (2013.01)

(58) Field of Classification Search
CPC ....... B66B 11/005; B66B 7/064; B66B 9/003; B66B 11/0005
See application file for complete search history.

(56) References Cited

U.S. PATENT DOCUMENTS

| | | | | |
|---|---|---|---|---|
| 7,896,137 | B2 * | 3/2011 | Ishikawa | B66B 1/34 187/290 |
| 11,034,544 | B2 * | 6/2021 | Madera | B66B 5/027 |
| 2019/0047816 | A1 | 2/2019 | Madera | |
| 2021/0221647 | A1 * | 7/2021 | Wong | B66B 1/32 |

FOREIGN PATENT DOCUMENTS

| | | | | | |
|---|---|---|---|---|---|
| CN | 101146729 | A | | 3/2008 | |
| CN | 106477435 | A | | 3/2017 | |
| CN | 108698793 | A | | 10/2018 | |
| CN | 109466990 | A | | 3/2019 | |
| CN | 111327126 | A | | 6/2020 | |
| CN | 112299201 | A | * | 2/2021 | |
| EP | 1864932 | A1 | | 12/2007 | |
| JP | 6687173 | B1 | | 4/2020 | |
| WO | WO-2010031998 | A1 | * | 3/2010 | B66B 11/0407 |

OTHER PUBLICATIONS

European Search Report for Application No. 21188933.2; dated Nov. 15, 2021; 11 Pages.

Chinese Office Action for Application No. 202110800297.X; dated Feb. 11, 2023; 8 Pages.

* cited by examiner

*Primary Examiner* — Diem M Tran

(74) *Attorney, Agent, or Firm* — CANTOR COLBURN LLP

(57) ABSTRACT

An elevator system including: an elevator car configured to travel through an elevator shaft; a first guide beam extending vertically through the elevator shaft, the first guide beam comprising a first surface and a second surface opposite the first surface; a propulsion system configured to move the elevator car through the elevator shaft; a first on-board energy management system configured to power the propulsion system, the first on-board energy management system is attached to the propulsion system and configured to travel with the propulsion system.

19 Claims, 3 Drawing Sheets

BEAM CLIMBER BATTERY CHARGING IN TRANSFER STATION

BACKGROUND

The subject matter disclosed herein relates generally to the field of elevator systems, and specifically to a method and apparatus for charging an on-board energy management system of a propulsion system for an elevator car.

Elevator cars are conventionally operated by ropes and counter weights, which typically only allow one elevator car in an elevator shaft at a single time.

BRIEF SUMMARY

According to an embodiment, an elevator system is provided. The elevator system including: an elevator car configured to travel through an elevator shaft; a first guide beam extending vertically through the elevator shaft, the first guide beam comprising a first surface and a second surface opposite the first surface; a propulsion system configured to move the elevator car through the elevator shaft; a first on-board energy management system configured to power the propulsion system, the first on-board energy management system is attached to the propulsion system and configured to travel with the propulsion system.

In addition to one or more of the features described herein, or as an alternative, further embodiments may include that the propulsion system is a beam climber system comprising: a first wheel in contact with the first surface; and a first electric motor configured to rotate the first wheel In addition to one or more of the features described herein, or as an alternative, further embodiments may include that the first on-board energy management system is configured to be recharged while attached to the propulsion system.

In addition to one or more of the features described herein, or as an alternative, further embodiments may include that the first on-board energy management system is configured to be recharged when the first on-board energy management system is located within a station or while the first on-board energy management system is traveling with the elevator car and the propulsion system through the station of the elevator system.

In addition to one or more of the features described herein, or as an alternative, further embodiments may include that the elevator car, the first on-board energy management system, the propulsion system, and the first guide beam are configured to transfer from a first vertical section of the elevator shaft to a second vertical section of the elevator shaft when the elevator car, the propulsion system, and the first on-board energy management system is located in the station.

In addition to one or more of the features described herein, or as an alternative, further embodiments may include: a trailing cable electrically connected to a power grid, wherein the power grid is configured to charge the first on-board energy management system through the trailing cable when the first on-board energy management system is within the station.

In addition to one or more of the features described herein, or as an alternative, further embodiments may include: a hard automation device configured to connect the trailing cable to the first on-board energy management system.

In addition to one or more of the features described herein, or as an alternative, further embodiments may include that the propulsion system is configured to move the elevator car, the propulsion system, and the first on-board energy management system to the station when a state of charge of the first on-board energy management system is below a selected low state of charge.

In addition to one or more of the features described herein, or as an alternative, further embodiments may include that the first on-board energy management system is configured to be recharged when detached from the propulsion system and replaced by a second on-board energy management system, the second on-board energy management system being configured to power the propulsion system when the first on-board energy management system is detached.

In addition to one or more of the features described herein, or as an alternative, further embodiments may include that the first on-board energy management system is configured to be removed when the first on-board energy management system is located within a station or while the first on-board energy management system is traveling with the elevator car and the propulsion system through the station of the elevator system.

In addition to one or more of the features described herein, or as an alternative, further embodiments may include that the second on-board energy management system is configured to be replace the first on-board energy management system when the first on-board energy management system is located within the station or while the first on-board energy management system is traveling with the elevator car and the propulsion system through a station of the elevator system.

In addition to one or more of the features described herein, or as an alternative, further embodiments may include that the second on-board energy management system is configured to replace the first on-board energy management system when the first on-board energy management system is located within the station or while the first on-board energy management system is traveling with the elevator car and the propulsion system through a station of the elevator system.

In addition to one or more of the features described herein, or as an alternative, further embodiments may include that the elevator car, the propulsion system, and the first guide beam are configured to transfer from a first vertical section of the elevator shaft to a second vertical section of the elevator shaft when the elevator car and the propulsion system is located in the station.

In addition to one or more of the features described herein, or as an alternative, further embodiments may include a hard automation device configured to remove the first on-board energy management system.

In addition to one or more of the features described herein, or as an alternative, further embodiments may include a hard automation device configured to replace the first on-board energy management system with the second on-board energy management system.

According to another embodiment, a method of operating an elevator system comprising: moving, using a propulsion system, an elevator car through an elevator shaft; powering, using a first on-board energy management system, the propulsion system; and moving, using the propulsion system, the propulsion system, the elevator car, and the first on-board energy management system to a station to recharge the first on-board energy management system or replace the first on-board energy management system.

In addition to one or more of the features described herein, or as an alternative, further embodiments may include that the station is at least one of a transfer station, a service station, or a parking area.

In addition to one or more of the features described herein, or as an alternative, further embodiments may include that the propulsion system is a beam climber system and the moving, using a propulsion system, an elevator car through an elevator shaft further comprises: rotating, using a first electric motor of a beam climber system, a first wheel, the first wheel being in contact with a first surface of a first guide beam that extends vertically through the elevator shaft.

In addition to one or more of the features described herein, or as an alternative, further embodiments may include recharging the first on-board energy management system.

In addition to one or more of the features described herein, or as an alternative, further embodiments may include moving the beam climber system, the elevator car and the first on-board energy management system to a station to recharge the first on-board energy management system.

Technical effects of embodiments of the present disclosure include charging an on-board energy management system or changing out the on-board energy management system when the elevator car is located in the transfer station or any other station, such as, for example, a service station or a parking area.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

and

Figure 4:
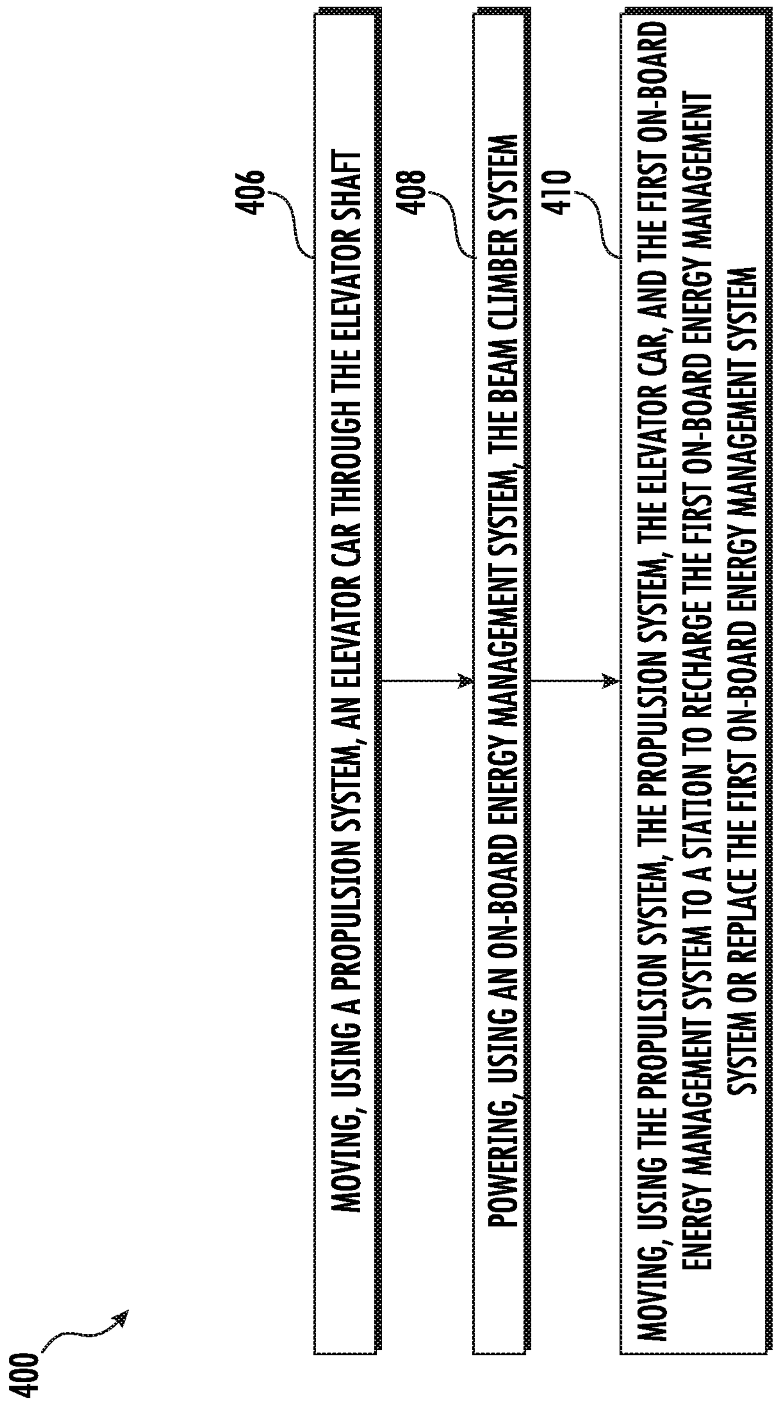

FIG. 4 is a flow chart of method of operating an elevator system, in accordance with an embodiment of the disclosure.

DETAILED DESCRIPTION

Figure 1:
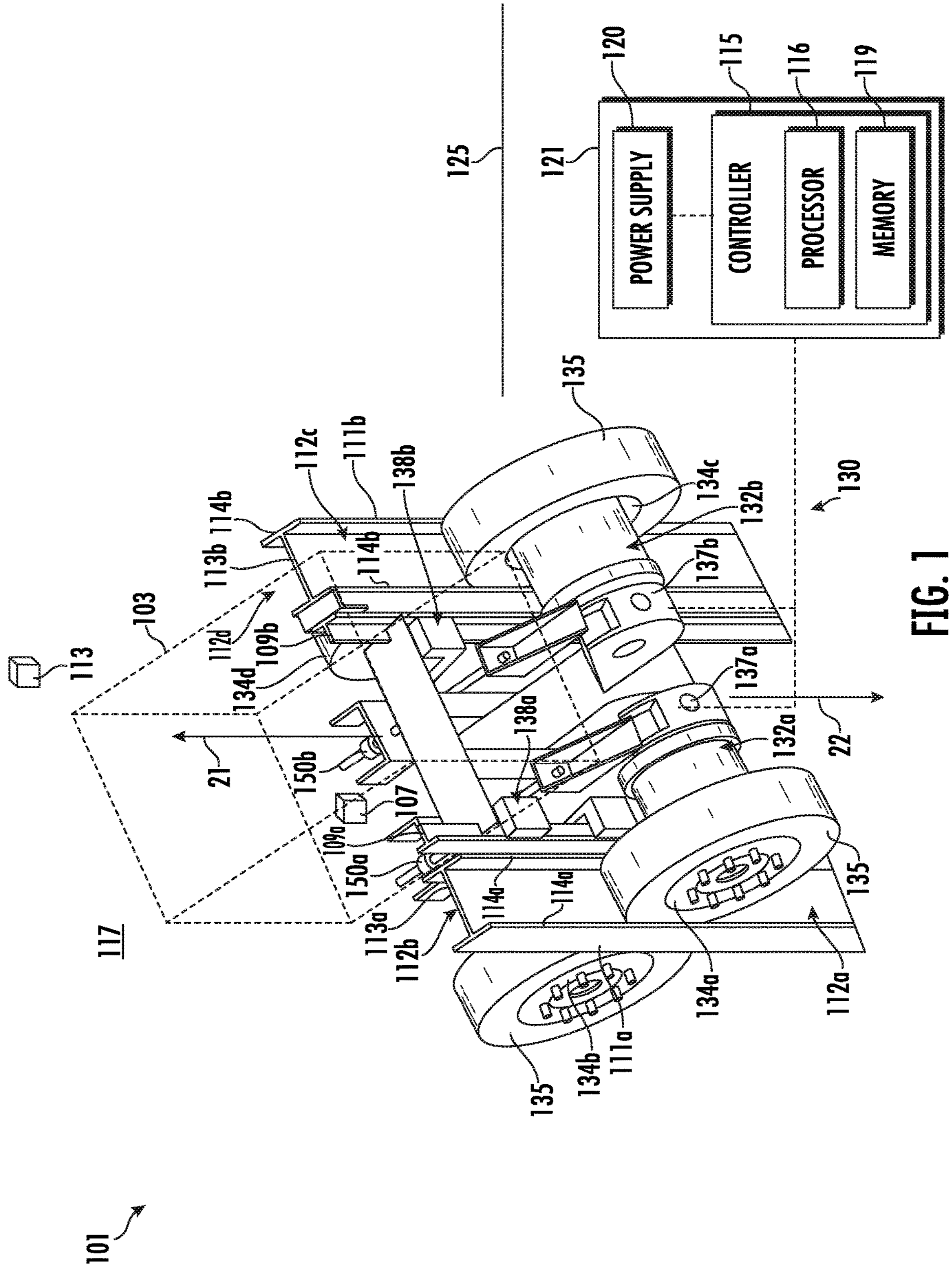
FIG. 1 is a schematic illustration of an elevator system with a beam climber system, in accordance with an embodiment of the disclosure.

FIG. 1 is a perspective view of an elevator system 101 including an elevator car 103, a beam climber system 130, a controller 115, and a power source 120. Although illustrated in FIG. 1 as separate from the beam climber system 130, the embodiments described herein may be applicable to a controller 115 included in the beam climber system 130 (i.e., moving through an elevator shaft 117 with the beam climber system 130) and may also be applicable to a controller located off of the beam climber system 130 (i.e., remotely connected to the beam climber system 130 and stationary relative to the beam climber system 130). Although illustrated in FIG. 1 as separate from the beam climber system 130, the embodiments described herein may be applicable to a power source 120 included in the beam climber system 130 (i.e., moving through the elevator shaft 117 with the beam climber system 130) and may also be applicable to a power source located off of the beam climber system 130 (i.e., remotely connected to the beam climber system 130 and stationary relative to the beam climber system 130).

The beam climber system 130 is configured to move the elevator car 103 within the elevator shaft 117 and along guide rails 109*a*, 109*b* that extend vertically through the elevator shaft 117. In an embodiment, the guide rails 109*a*, 109*b* are T-beams. The beam climber system 130 includes one or more electric motors 132*a*, 132*b*. The electric motors 132*a*, 132*b* are configured to move the beam climber system 130 within the elevator shaft 117 by rotating one or more wheels 134*a*, 134*b* that are pressed against a guide beam 111*a*, 111*b*. In an embodiment, the guide beams 111*a*, 111*b* are I-beams. It is understood that while an I-beam is illustrated, any beam or similar structure may be utilized with the embodiment described herein. Friction between the wheels 134*a*, 134*b*, 134*c*, 134*d* driven by the electric motors 132*a*, 132*b* allows the wheels 134*a*, 134*b*, 134*c*, 134*d* to climb up 21 and down 22 the guide beams 111*a*, 111*b*. The guide beam extends vertically through the elevator shaft 117. It is understood that while two guide beams 111*a*, 111*b* are illustrated, the embodiments disclosed herein may be utilized with one or more guide beams. It is also understood that while two electric motors 132*a*, 132*b* are illustrated, the embodiments disclosed herein may be applicable to beam climber systems 130 having one or more electric motors. For example, the beam climber system 130 may have one electric motor for each of the four wheels 134*a*, 134*b*, 134*c*, 134*d*. The electrical motors 132*a*, 132*b* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 103).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto the web portion 113*a* of the first guide beam 111*a*. The first compression mechanism 150*a* may be a metallic or elastomeric spring mechanism, a pneumatic mechanism, a hydraulic mechanism, a turnbuckle mechanism, an electro-mechanical actuator mechanism, a spring system, a hydraulic cylinder, a motorized spring setup, or any other known force actuation method. The first compression mechanism 150*a* may be adjustable in real-time during operation of the elevator system 101 to control compression of the first wheel 134*a* and the second wheel 134*b* on the first guide beam 111*a*. The first wheel 134*a* and the second wheel 134*b* may each include a tire 135 to increase traction with the first guide beam 111*a*.

The first surface 112*a* and the second surface 112*b* extend vertically through the shaft 117, thus creating a track for the first wheel 134*a* and the second wheel 134*b* to ride on. The flange portions 114*a* may work as guardrails to help guide the wheels 134*a*, 134*b* along this track and thus help prevent the wheels 134*a*, 134*b* from running off track.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*. The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 103.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*. The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 101 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track for the third wheel 134*c* and the fourth wheel 134*d* to ride on. The flange portions 114*b* may work as guardrails to help guide the wheels 134*c*, 134*d* along this track and thus help prevent the wheels 134*c*, 134*d* from running off track.

The second electric motor 132*b* is configured to rotate the third wheel 134*c* to climb up 21 or down 22 the second guide beam 111*b*. The second electric motor 132*b* may also include a second motor brake 137*b* to slow and stop rotation of the second motor 132*b*. The second motor brake 137*b* may be mechanically connected to the second motor 132*b*. The second motor brake 137*b* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109 proximate the elevator car 103.

The elevator system 101 may also include a position reference system 113. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the elevator system (e.g., the elevator car 103 or the beam climber system 130), or may be located in other positions and/or configurations as known in the art. The position reference system 113 can be any device or mechanism for monitoring a position of an elevator car within the elevator shaft 117, as known in the art. For example, without limitation, the position reference system 113 can be an encoder, sensor, accelerometer, altimeter, pressure sensor, range finder, or other system and can include velocity sensing, absolute position sensing, etc., as will be appreciated by those of skill in the art.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 103 and the beam climber system 130. For example, the controller 115 may provide drive signals to the beam climber system 130 to control the acceleration, deceleration, leveling, stopping, etc. of the elevator car 103.

The controller 115 may also be configured to receive position signals from the position reference system 113 or any other desired position reference device.

When moving up 21 or down 22 within the elevator shaft 117 along the guide rails 109*a*, 109*b*, the elevator car 103 may stop at one or more landings 125 as controlled by the controller 115. In one embodiment, the controller 115 may be located remotely or in the cloud. In another embodiment, the controller 115 may be located on the beam climber system 130. In embodiment, the controller 130 controls on-board motion control of the beam climber system 115 (e.g., a supervisory function above the individual motor controllers).

The power supply 120 for the elevator system 101 may be any power source, including a power grid and/or battery power which, in combination with other components, is supplied to the beam climber system 130. In one embodiment, power source 120 may be located on the beam climber system 130. In an embodiment, the power supply 120 is a battery that is included in the beam climber system 130.

The elevator system 101 may also include an accelerometer 107 attached to the elevator car 103 or the beam climber system 130. The accelerometer 107 is configured to detect an acceleration and/or a speed of the elevator car 103 and the beam climber system 130.

It is understood that while a beam climber system 130 is illustrated herein for exemplary discussion, the embodiments disclosed herein may be applicable to other multi-car linear motor based propulsion systems, such as, for example, a permanent magnet motor propulsion system.

Referring now to FIGS. 2A, 2B, 3A and 3B, with continued reference to FIG. 1, a battery replenishment system 200 is illustrated, in accordance with an embodiment of the present disclosure. The beam climber system 130 may not include a trailing electrical cable, such that, no electrical cords extend between the beam climber system 130 and the elevator shaft during normal operation. When utilizing multiple elevator cars 103 in a single elevator shaft 117, the use of permanently attached trailing electrical cables in the elevator shaft 117 becomes difficult and complex. This becomes even more complex as the multiple different elevator cars 103*a* need to move between multiple different elevator shafts 117 or vertical sections (e.g., first vertical sections 117*a*, 117*b*, see discussed herein). Thus, it is advantageously to utilize on-board power supplies 120. This requires that the power supply 120 be contained onboard the elevator car 103 or the beam climber system 130 (i.e., attached in some way to the beam climber system 130, such that the power supply 120 may be electrically connected to the beam climber system 130). Since the power supply 120 may be finite, it will eventually need to be exchanged for a new power supply 120 or recharged. The embodiments described herein provide a method and apparatus for replenishing power to a power supply 120 to power the elevator car 103 and the beam climber system 130.

In an embodiment, the power supply is an on-board energy management system 120*a*, 120*b*. The on-board energy management system 120*a*, 120*b* may consist of a battery pack, supercapacitors, and/or any other energy storage device known to one of skill in the art. The battery pack may include one or more lithium ion batteries or similar battery type know to one of skill in the art. The on-board energy management system 120*a*, 120*b* is configured to travel with the elevator car 103 and the beam climber system 130. The on-board energy management system 120*a*, 120*b* is electrically connected to the beam climber system 130. The on-board energy management system 120*a*, 120*b* may be attached to the elevator car 103 or the beam climber system 130. The beam climber system 130 may be configured to move the on-board energy management system 120*a*, 120*b* along with the beam climber system 130 and the elevator car 103 to a transfer station 310 when a state of charge of the on-board energy management system 120*a*, 120*b*, is below a selected low state of charge or when the elevator system 101 requires the elevator car 103 to go through the transfer station 310. The battery replenishment system 200 is configured to charge and or transfer the on-board energy management systems 120*a*, 120*b* of the beam climber system 130 when the beam climber system 130 and the elevator car 103 is moving through a transfer station 310. The transfer station 310 may be located at the top of the elevator shaft 117 or the bottom of the elevator shaft 117. The transfer station 310 is configured to move elevator car 103, the beam climber system 130, the guide beams 111*a*, 111*b*, the guide rails 109*a*, 109*b*, from a first vertical section 117*a* of the elevator shaft 117 to a second vertical section 117*b* of the elevator shaft 117 when the elevator car 103 and the beam climber system 130 are located in the transfer station 310. This may be accomplished with the use of transfer beams 170 operably connected guide beams 111*a*, 111*b* or any similar technology. The guide beams 111*a*, 111*b* may be interconnected to the transfer beams 170 through a series of interconnected crossbeams 172. The crossbeams 172 may roll or glide along the transfer beams 170 to transfer from the first vertical section 117*a* to the second vertical section 117*b* of the elevator shaft 117.

Figures 2A, 2B, 3A, 3B:
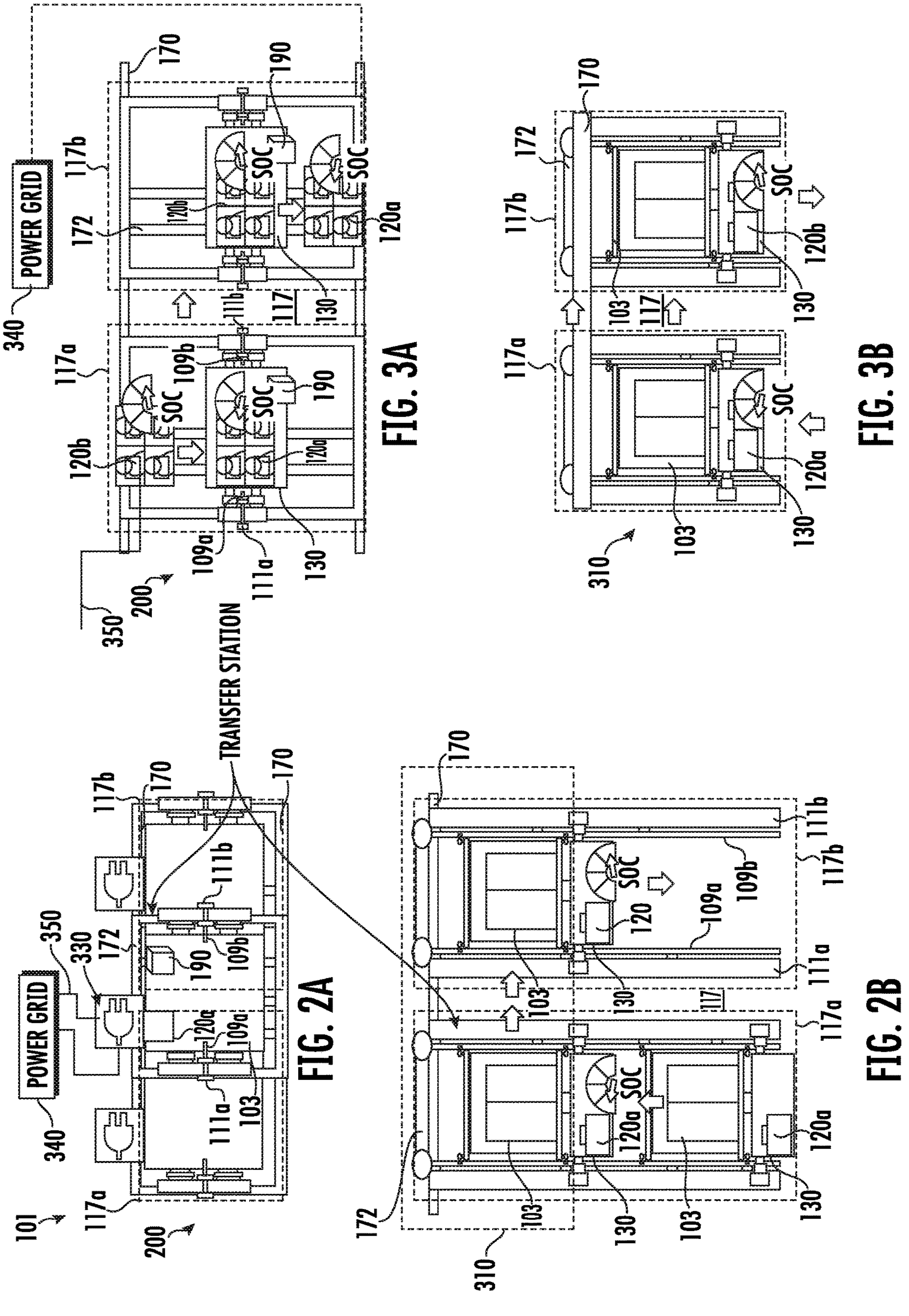
FIG. 2A illustrates a schematic top view of a battery replenishment system that charges a first on-board energy management system, in accordance with an embodiment of the disclosure.
FIG. 2B illustrates a schematic side view of a battery replenishment system that charges the first on-board energy management system, in accordance with an embodiment of the disclosure.
FIG. 3A illustrates a schematic top view of a battery replenishment system that replaces the first on-board energy management system with a second on-board energy management system, in accordance with an embodiment of the disclosure.
FIG. 3B illustrates a schematic side view of a battery replenishment system that charges the first on-board energy management system with a second on-board energy management system, in accordance with an embodiment of the disclosure.

In the embodiment illustrated in FIGS. 2A and 2B, the first on-board energy management system 120*a* is configured to be recharged while attached to the beam climber system 130 or in other words while being electrically connected to the beam climber system 130. In an embodiment, the first on-board energy management system 120*a* is charged as the elevator car 103, the beam climber system 130, the guide beams 111*a*, 111*b*, and the guide rails 109*a*, 109 are located within the transfer station 310. In another embodiment, the first on-board energy management system 120*a* is charged within the transfer station 310 as the elevator car 103, the beam climber system 130, the guide beams 111*a*, 111*b*, and the guide rails 109*a*, 109 are moved from the first vertical section 117*a* of the elevator shaft 117 to the second vertical section 117*b* of the elevator shaft 117 in the transfer station 310. The transfer station 310 is configured to move elevator car 103, the beam climber system 130, the first on-board energy management system 120*a*, the guide beams 111*a*, 111*b*, the guide rails 109*a*, 109*b*, from a first vertical section 117*a* of the elevator shaft 117 to a second vertical section 117*b* of the elevator shaft 117 when the elevator car 103 and the beam climber system 130 are located in the transfer station 310.

The first on-board energy management system 120*a* may be charged by a trailing cable 330, or similar device known to one of skill in the art, that plugs into the first on-board energy management system 120*a* in the transfer station 310 and moves with the first on-board energy management system 120*a* as the first on-board energy management system 120*a* is moved from the first vertical section 117*a* of the elevator shaft 117 to the second vertical section 117*b* of the elevator shaft 117. The trailing cable 330 electrically connects the first on-board energy management system 120*a* to a power grid 340 and the power grid 340 charges the first on-board energy management system 120*a* through the trailing cable 330. Adequate checks and confirmation signals may be utilized by the controller 115 to ensure proper and safe charging. The trailing cable 330 may be plugged into the first on-board energy management system 120*a* by a hard automation device that is a mechanism with the dedicated degrees of freedom required to grab, pull, release, remove, and/or insert the on-board energy management systems 120*a*, 120*b*. The hard automation device may be a robotic arm 350. In one example, when the first on-board energy management system 120*a*, elevator car 103, and the beam climber system 130 enter the transfer station 310 in the first vertical section 117*a* of the elevator shaft 117, the trailing cable 330 may be plugged into the first on-board energy management system 120*a* and the trailing cable 330 may remained plugged into the first on-board energy management system 120*a* to charge the first on-board energy management system 120*a* as the first on-board energy management system 120*a*, elevator car 103, and the beam climber system 130 move horizontally through the transfer station 131 to the second vertical section 117*b* where the trailing cable 330 is removed from the first on-board energy management system 120. Alternatively, rather than a trailing cable, there be metallic contacts on the first on-board energy management system 120*a* that contact a charging strip connected to the power grid 340 in the transfer station 131 and the metallic contacts on the first on-board energy management system 120*a* slide along the charge strip to receive charge. Alternatively, there may be a wireless power charging system in the transfer station 131 to wirelessly transfer power between the power grid 340 and the first on-board energy management system 120*a*. The wireless power charging system may utilize wireless induction charging or any other type of wireless charging known to one of skill in the art.

In the embodiment illustrated in FIGS. 3A and 3B, the first on-board energy management system 120*a* is configured to be detached from the beam climber system and recharged when detached from the beam climber system 130. The first on-board energy management system 120*a* is removed from the elevator system and replaced by a second on-board energy management system 120*b* as the elevator car 103, the beam climber system 130, the guide beams 111*a*, 111*b*, and the guide rails 109*a*, 109 are moved from the first vertical section 117*a* of the elevator shaft 117 to the second vertical section 117*b* of the elevator shaft 117 in the transfer station 310. The second on-board energy management system 120*b* may be fully charged or charged to a state of charge that is greater than a selected upper state of charge. The first on-board energy management system 120*a* may be removed by a hard automation device that is a mechanism with the dedicated degrees of freedom required to grab, pull, release, remove, and/or insert the on-board energy management systems 120*a*, 120*b*. The hard automation device may be a robotic arm 350, or similar device known to one of skill in the art, that removes the first on-board energy management system 120*a* from the beam climber system 130 in the transfer station 310 and inserts the second on-board energy management system 120*b* into the beam climber system 130 as the beam climber system 130 and elevator car 103 is moved from the first vertical section 117*a* of the elevator shaft 117 to the second vertical section 117*b* of the elevator shaft 117. The first on-board energy management system 120*a* will remain in the transfer station 310 to be charged by grid power 340 until a beam climber system 130 requires the first on-board energy management system 120*s*. It is understood that there may be multiple beam climber systems 130 and elevator cars 103 in a single elevator shaft 117, thus the first on-board energy management system 120*a* and the second on-board energy management system 120*b* may operate as a communal or any number of shared on-board energy management system from multiple different elevator cars 103 to utilize. There may multiple shared on-board energy management systems held in reserve for some to be in use while others charge.

Prior to entering the transfer station 310, the elevator system 101 may be required to determine whether the elevator car 103 is empty of humans. In an embodiment, the elevator car 103 may be prevented from entering the transfer station 310 if humans are detected in the elevator car 103. In other words, in an embodiment, the elevator car 103 must be free of humans prior to the elevator car 103 entering the transfer station 310. It is understood that the embodiments disclosed herein are not limited to the elevator car 103 being free of humans with the transfer station 310. This is dependent of the intensity of movement of the elevator car 103 movement within the transfer station 310 and/or duration of the elevator car 103 being with the transfer station 310. If the movement of the elevator car 103 is intense the elevator car 103 would have to be free of humans but if the movement is at or below normal intensity then humans may be located in the elevator car 103. Normal intensity of movement would be the movement utilized when normally carrying humans during normal operations.

The elevator system 101 may include a human sensing device 190. The human sensing device 190 may be composed of at least one of a camera, a depth sensing device, a RADAR device, a thermal detection device, a floor pressure sensor, a microphone, or any similar human detection device known to one of skill in the art. The human sensing device 190 may also comprise any other device capable of sensing the presence of humans, as known to one of skill in the art. The human sensing device 190 may utilize the camera to detect a human and/or an object within the elevator car 103. The camera may be configured to capture an image or video within the elevator car 103. The depth sensing device may be a 2-D, 3-D or other depth/distance detecting camera that utilizes detected distance to an object and/or a human to detect a human and/or an object within the elevator car 103. The depth sensing device generates depth maps for analysis. The RADAR device may utilize radio waves to detect a human and/or an object within the elevator car 103. The RADAR device generates RADAR signals for analysis. The thermal detection device may be an infrared or other heat sensing camera that utilizes detected temperature to detect a human and/or an object within the elevator car 103. The thermal detection device generates thermal images for analysis. The floor pressure sensor may be one or more pressure sensors located in the floor of an elevator car 103 that utilizes pressure data on the floor to detect a human and/or an object within the elevator car 103. The floor pressure sensor generates a pressure map for analysis. The human sensing device 190 may additionally include a microphone configured to capture sound data within the elevator car 103. As may be appreciated by one of skill in the art, in addition to the stated methods, additional methods may exist to detect humans and objects, thus one or any combination of these methods may be used to determine the presence of humans or objects in an elevator car 103.

The human sensing device 190 may utilize a cognitive service that is configured to detect an individual and/or an object within the elevator car 103 through image recognition, video analytics, neural networks, machine learning, deep learning, artificial intelligence, speech recognition, computer vision, video indexer or any other known method to one of skill in the art.

Referring now to FIG. 4, with continued reference to the previous FIGS., a flow chart of method 400 of operating an elevator systems 101 is illustrated, in accordance with an embodiment of the disclosure.

At block 406, the beam climber system 130 moves an elevator car 103 through the elevator shaft when the first wheel 134*a* of the beam climber system 130 rotates along the first surface 112*a* of the first guide beam 111*a*. Block 404 may further comprise that a first electric motor 132*a* of a beam climber system 130 rotates a first wheel 134*a* to move the elevator car 103 through the elevator shaft 117. The first wheel 134*a* being in contact with a first surface 112*a* of a first guide beam 111*a* that extends vertically through an elevator shaft 117.

At block 408, the first on-board energy management system 120*a* powers the beam climber system 130.

At block 410, the propulsion system moves the propulsion system, the elevator car 103, and the first on-board energy management system 120*a* to a station to recharge the first on-board energy management system 120*a* or replace the first on-board energy management system 120*a*.

Once the first on-board energy management system 120*a* is recharged or replaced the controller 115 may confirm that the on-board energy management system currently installed in the propulsion is healthy and free to move away from the station and thus resume normal operations.

In an embodiment the station is at least one of a transfer station 310, a service station, or a parking area.

The method 400 may further comprise that the first on-board energy management system 120*a* is recharged. The beam climber system 130, the elevator car 103, and the first on-board energy management system 120*a* may be moved to a station 310 to recharge the first on-board energy management system 120*a*.

The method 400 may further comprise that a trailing cable 330 is electrically connected to the first on-board energy management system 120*a*. The first on-board energy management system 120*a* is electrically connected to a power grid 340 and the power grid 340 is configured to charge the first on-board energy management system 120*a* through the trailing cable 330 when the first on-board energy management system 120*a* is within the station.

The method 400 may further comprise that the beam climber system 130, the elevator car 103, and the first on-board energy management system 120*a* are moved through the station while recharging the first on-board energy management system 120*a*.

The method 400 may additionally comprise that the first on-board energy management system 120*a* is removed from the beam climber system 130 and a second on-board energy management system 120*b* is electrically connected to the beam climber system 130. The second on-board energy management system 120*b* powers the beam climber system 120*a*.

While the above description has described the flow process of FIG. 3 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

an elevator car configured to travel through an elevator shaft;

a first guide beam extending vertically through the elevator shaft, the first guide beam comprising a first surface and a second surface opposite the first surface;

a propulsion system configured to move the elevator car through the elevator shaft; and a first on-board energy management system configured to power the propulsion system, the first on-board energy management system is attached to the propulsion system and configured to travel with the propulsion system;

a trailing cable configured to electrically connect to a power grid, wherein the power grid is configured to charge the first on-board energy management system through the trailing cable when the first on-board energy management system is within a station and traveling horizontally between a first vertical section of the elevator shaft and a second vertical section of the elevator shaft.

2. The elevator system of claim 1, wherein the propulsion system is a beam climber system comprising:

a first wheel in contact with the first surface; and a first electric motor configured to rotate the first wheel.

3. The elevator system of claim 1, wherein the first on-board energy management system is configured to be recharged while attached to the propulsion system.

4. The elevator system of claim 3, wherein the first on-board energy management system is configured to be recharged when the first on-board energy management system is located within the station or while the first on-board energy management system is traveling with the elevator car and the propulsion system through the station of the elevator system.

5. The elevator system of claim 4, wherein the elevator car, the first on-board energy management system, the propulsion system, and the first guide beam are configured to transfer from a first vertical section of the elevator shaft to a second vertical section of the elevator shaft when the elevator car, the propulsion system, and the first on-board energy management system is located in the station.

6. The elevator system of claim 1, further comprising:

a hard automation device configured to connect the trailing cable to the first on-board energy management system.

7. The elevator system of claim 1, wherein the propulsion system is configured to move the elevator car, the propulsion system, and the first on-board energy management system to the station when a state of charge of the first on-board energy management system is below a selected low state of charge.

8. The elevator system of claim 1, wherein the first on-board energy management system is configured to be recharged when detached from the propulsion system and replaced by a second on-board energy management system, the second on-board energy management system being configured to power the propulsion system when the first on-board energy management system is detached.

9. The elevator system of claim 8, wherein the first on-board energy management system is configured to be removed when the first on-board energy management system is located within the station or while the first on-board energy management system is traveling with the elevator car and the propulsion system through the station of the elevator system.

10. The elevator system of claim 9, wherein the second on-board energy management system is configured to be replace the first on-board energy management system when the first on-board energy management system is located within the station or while the first on-board energy management system is traveling with the elevator car and the propulsion system through the station of the elevator system.

11. The elevator system of claim 9, wherein the second on-board energy management system is configured to replace the first on-board energy management system when the first on-board energy management system is located within the station or while the first on-board energy management system is traveling with the elevator car and the propulsion system through the station of the elevator system.

12. The elevator system of claim 9, wherein the elevator car, the propulsion system, and the first guide beam are configured to transfer from a first vertical section of the elevator shaft to a second vertical section of the elevator shaft when the elevator car and the propulsion system is located in the station.

13. The elevator system of claim 9, further comprising:

a hard automation device configured to remove the first on-board energy management system.

14. The elevator system of claim 9, further comprising:

a hard automation device configured to replace the first on-board energy management system with the second on-board energy management system.

15. A method of operating an elevator system comprising:

moving, using a propulsion system, an elevator car through an elevator shaft;

powering, using a first on-board energy management system, the propulsion system; and moving, using the propulsion system, the elevator car, and the first on-board energy management system to a station to recharge the first on-board energy management system or replace the first on-board energy management system;

using a trailing cable configured to electrically connect to a power grid to charge the first on-board energy management system, wherein the power grid is configured to charge the first on-board energy management system through the trailing cable when the first on-board energy management system is within the station and traveling horizontally between a first vertical section of the elevator shaft and a second vertical section of the elevator shaft.

16. The method of claim 15, wherein the station is at least one of a transfer station, a service station, or a parking area.

17. The method of claim 15, wherein the propulsion system is a beam climber system and the moving, using a propulsion system, an elevator car through an elevator shaft further comprises:

rotating, using a first electric motor of a beam climber system, a first wheel, the first wheel being in contact with a first surface of a first guide beam that extends vertically through the elevator shaft.

18. The method of claim 15, further comprising:

recharging the first on-board energy management system.

19. The method of claim 18, further comprising:

moving the beam climber system, the elevator car and the first on-board energy management system to the station to recharge the first on-board energy management system.

* * * * *